United States Patent
Gavrel et al.

(10) Patent No.: US 6,719,894 B2
(45) Date of Patent: Apr. 13, 2004

(54) PROCESS FOR ELECTROCOAGULATING WASTE FLUIDS

(75) Inventors: Tom Gus Gavrel, Seabrook, TX (US); David W. Otto, Shiner, TX (US); Ira B. Vinson, 1306 Marina Bay Dr., Clear Lake Shore #312C, Kemah, TX (US) 77565

(73) Assignees: Ira B. Vinson, El Lago, TX (US); Tom G. Gavrel, Seabrook, TX (US)

( * ) Notice: Subject to any disclaimer, the term of this patent is extended or adjusted under 35 U.S.C. 154(b) by 227 days.

(21) Appl. No.: 09/925,060

(22) Filed: Aug. 8, 2001

(65) Prior Publication Data

US 2002/0020631 A1 Feb. 21, 2002

Related U.S. Application Data

(60) Provisional application No. 60/224,615, filed on Aug. 11, 2000.

(51) Int. Cl.[7] .................................................. C02F 1/463
(52) U.S. Cl. .................. 205/744; 205/757; 204/237; 204/269; 204/672; 204/673
(58) Field of Search .................................. 205/757, 744; 204/672, 673, 269, 237

(56) References Cited

U.S. PATENT DOCUMENTS

| | | | |
|---|---|---|---|
| 3,969,245 A | | 7/1976 | Ramirez ..................... 210/44 |
| 3,974,070 A | * | 8/1976 | Popov et al. ................. 210/47 |
| 5,928,493 A | * | 7/1999 | Morkovsky et al. ........ 205/757 |
| 6,488,835 B1 | * | 12/2002 | Powell ....................... 205/744 |

FOREIGN PATENT DOCUMENTS

| | | | |
|---|---|---|---|
| DE | 3641365 A1 | 8/1988 | ............ C02F/9/00 |
| RU | 2140880 c1 | * 11/1999 | |

* cited by examiner

Primary Examiner—Arun S. Phasge
(74) Attorney, Agent, or Firm—Bracewell & Patterson LLP

(57) ABSTRACT

An electrocoagulation process for removing organic and metal contaminants from a pressurized waste fluid is disclosed in which a clarified waste fluid is produced when the pressure is released.

41 Claims, 3 Drawing Sheets

PROCESS FOR ELECTROCOAGULATING WASTE FLUIDS

This application claims the benefits of provisional patent application, U.S. Ser. No. 60/224,615, filed Aug. 11, 2000, incorporated herein by reference.

BACKGROUND OF INVENTION

1. Technical Field

This invention relates to a process for removing organics, particulates and dissolved metal contaminates from waste fluids by electrolysis, more particularity, the invention utilizes a high pressure electrocoagulative process to convert the dissolved metal contaminates to suspended particles, utilizing dissolved gases where upon release of the pressure, the dissolved gases and suspended particles rise to the waste fluid surface to facilitate removal of the metal contaminates and an organics removal means is used to remove the organic contaminates.

2. Description of the Technology and Art

Electrocoagulation is a process by which electrolysis is combined with precipitation and flocculation to remove contaminates from wastewater. In this process, an electric current is used to neutralize, reduce and/or oxidize ionic, particulate or other dissolved species and contaminates, thereby allowing such contaminants to be precipitated and removed from stable suspensions and emulsions, such as in wastewater fluids. The electric current (voltage) provides the electromotive force required to drive the chemical reactions. The reactor utilized in the process contains a series of substantially parallel electrolytic plates or electrodes through which the wastewater to be treated travels in a serpentine path while being exposed to a strong electric field or voltage.

The electromotive force present in the reactor overcomes the Stem's forces disrupting the outer electron orbitals of dissolved ionic species and neutralizes colloidal particulate charges resulting in the destabilization of contaminants. The principal cathodic reaction is the reduction of hydrogen ion to hydrogen gas and the reduction of the valence state of some dissolved species. The anode sacrifices metallic ions into solution in accordance with Faraday's Law and liberates oxygen gas. The newly formed compounds may be precipitated as acid resistant metallic oxide complexes that may be agglomerated or flocculated and removed by conventional liquid-solids separation methodologies.

However, it has been difficult to remove contaminates by electrocoagulation that do not readily form a precipitant. It is possible to convert such contaminates to gaseous compounds, such as chlorine gas from chloride and ammonia gas from nitrate. Also, some organic compounds may be oxidized or reduced to gaseous species. Electrolysis of water molecules in the waste fluid liberates oxygen and hydrogen gas by simultaneous oxidation and reduction reactions. At atmospheric pressure, these gases evolve as bubbles that must be removed prior to separation of the precipitate.

A prior art electrocoagulation method is the Kaselco system, described in U.S. Pat. No. 5,928,493. This method utilizes an electrocoagulation reactor to precipitate contaminants. After the wastewater fluid is treated in an electrolytic reactor, the fluid enters an agitated de-foam tank where the entrained gas bubbles are allowed to dissipate and escape. A flocculating agent is added and the water then enters a clarifier where particulates are separated by conventional sedimentation technology. The Kaselco system, however, is not capable of removing entrained gas bubbles and clarifying flocs from the wastewater in a single step and includes additional tankage, mixers and piping.

However, there is a need for a pressurized electrocoagulation process in which the oxygen and hydrogen gases produced will remain in solution. These dissolved gases also remain available for subsequent oxidation-reduction reactions with wastewater contaminates. When the pressure is released, the dissolved gases evolve from solution as microfine bubbles to encourage rapid flotation and separation of agglomerated particulates to a liquid surface.

The present invention meets these needs and other needs.

SUMMARY OF INVENTION

In accordance with the present invention, an electrocoagulation process for removing organics, particulates and metal contaminants from a waste fluid to form a clarified waste fluid has been discovered which includes the steps of supplying the waste fluid to a reactor vessel which have a plurality of substantially parallel electrolytic plates. The electrolytic plates have a positive or a negative charge that is provided by a power supply. The waste fluid is pressurized to pressure from about 1 to about 100 psig and then reacted with the charged electrolytic plates. Water, organics, particulates and metal contaminants form dissolved gases and form precipitate particles in the pressurized waste fluid. The pressure of said waste fluid is reduced to release the dissolved gases and to cause said precipitate particles to rise in said vessel. Precipitate particles are removed from the vessel to form the clarified waste fluid.

The invention also includes an apparatus for treating organics, particulates and metal contaminates in a waste fluid using electrocoagulation which comprises a collection means having an inlet for collecting said waste fluid. A reactor vessel is in fluid communication with said collection means, said reactor vessel having a vessel pressure and a plurality of substantially parallel positively and negatively charged electrolytic plates. A power supply connected to said electrolytic plates, said power supply provides a voltage that causes said contaminants to react with water and said electrolytic plates to form dissolved gases and precipitate particles in said waste fluid. A pressurizing means in fluid communication with said reactor vessel for pressurizing said waste fluid to said vessel pressure of said reactor vessel. A flotation chamber in fluid communication with said reactor vessel, said flotation chamber having a chamber pressure below said vessel pressure so that dissolved gases evolve from said waste fluid causing said precipitate particles to float to a fluid surface for removal to form a clarified waste fluid.

The apparatus of this invention may also include means for removal of organics from the clarified waste fluid to form a purified fluid stream. The organics removal means includes a reactor having a membrane and/or bioreactor.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

DETAILED DESCRIPTION OF PREFERRED EMBODIMENT

The influent wastewater fluid that are treated by the process apparatus of this invention may be raw wastewater, chemically treated water that is ready for liquid-solids separation, water that has been treated by an electrocoagulation reactor (in this case there will be two reactors), water containing free or emulsified oils or other aqueous fluid. The contaminates contained in the influent wastewater fluids may include colloidal particulates, heavy metals, dyes, solvents, oils, greases, fats, salts and the like.

Figure 1:
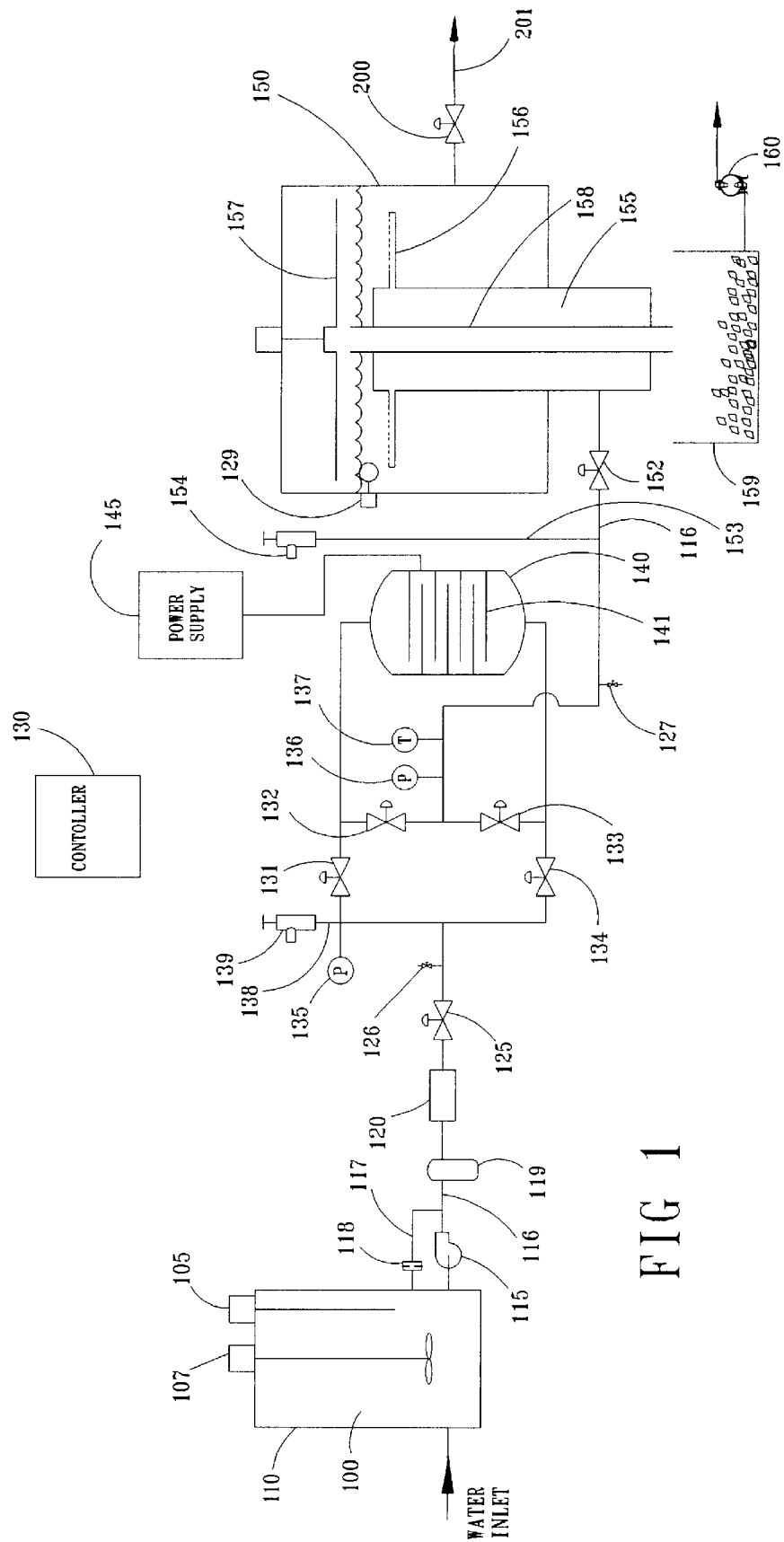
FIG. 1 is a schematic flow diagram of the electrocoagualtion process that is used to produce a clarified waste fluid in accordance with this invention.

Referring now to FIG. 1, influent waste fluid (100) is received in a collection/neutralization tank (110) with an agitator (107) and a pH sensor (105) for monitoring of the pH of fluid (100). The pH of fluid (100) may be adjusted to between 5.0 to 9.0, preferably to about 7.0, by the addition of acid or basic chemical reagents. The fluid (100) is then pumped through fluid pipe (116) via a high flow/high pressure pump (115) to the electrocoagulation reaction vessel (140), either continuously or on a batchwise basis. A recirculation pipe (117) that is connected to fluid pipe (116) is used to return excess fluid flow to the collection/neutralization tank (110). Orifice (118) in recirculation pipe (117) and actuated flow control valve (125) work together to maintain back pressure on pump (115) and to allow variable control of the flow rate and pressure of fluid (100) through the process. Wastewater fluid (100) is thereby pressurized as pressurized waste fluid (101). The pressure of pressurized waste fluid (101) may be between 0 to 150 psig, preferably between about 60 to 80 psig. The flow rate of fluid (100) may be between 10 to 250 gallons per minute, preferably about 50 gallons per minute. A strainer (119) is placed in-line with the interconnecting pipe (116) to remove particulate matter and avoid interference with the flow monitor (120) and prevent plugging of the electrocoagulation reaction vessel (140).

A controller (130) monitors all parameters for control of the system (flow rate, pressure, dissolved oxygen, temperature, pH, voltage, and current) and controls all actuated valves, pumps, motors, aerators and agitators. The controller may be computerized PLC or other configured system utilizing analog and discrete inputs and outputs. The flow monitor (120) monitors the flow rate and transmits a proportional signal to the controller (130) allowing variable flow rate and pressure values to be entered into the controller (130) and thus maintained within the system by throttling of the actuated flow control valve (125). Differing degrees of treatment and flotation may be attained by varying the pressure.

The pressurized waste fluid (101) may flow through the electrocoagulation reaction vessel (140) in two opposite directions determined by the positioning of the actuated valves (131,132,133,134). Actuated valves may include any type valve (ball, butterfly, etc.) equipped with an electric or pneumatic positioner that receives a discrete or proportional signal from the controller (130) thereby opening or closing the valve proportionally with the signal. The direction of flow through the reactor is reversed periodically to insure even wear from both sides of the metallic electrolytic plates (141) and to avoid plugging of flow through the electrocoagulation reaction vessel (140). Pressure in the system as well as differential pressure through the electrocoagulation reaction vessel (140) are monitored by pressure sensors (135/inlet and 136/outlet) which transmit a variable signal proportional to the pressure to the controller (130). Temperature of the fluid exiting the electrocoagulation reaction vessel (140) is monitored by a thermal sensor (137) which transmits a proportional signal to the controller (130). A pressure relief valve (139) is connected to the interconnecting pipe (116) to relieve pressure from the system in case of an emergency or system failure. The pressure relief valve (139) is mounted on a riser pipe (138) such that it is the highest elevation in the piping structure feeding the electrocoagulation reaction vessel (140) such that any gases not in solution will rise and be collected at the highest point in the riser pipe (138) and periodically be released from the system through the pressure relief valve (139) avoiding inclusion of any non-dissolved gas bubbles in the pressurized waste fluid (101) entering the electrocoagulation reaction vessel (140). Gases are resistive to electrical current reducing the conductivity of the influent pressurized waste fluid (101) therefore inhibiting treatment of the influent pressurized waste fluid (101).

The electrocoagulation reaction vessel (140) contains a series of substantially parallel metallic electrolytic plates (141) arranged substantially parallel to each other. The plates may be fabricated from material which may sacrifice or donate ions in a electrolytic process. Preferably, the plates may be fabricated from iron, titanium, platinum, steel, aluminum, copper carbon, metal-impregnated plastics, ceramics or the like. Pressurized waste fluid (101) meanders through the electrolytic plates (141) in electrocoagulation reaction vessel (140) and is under the influence of the electromotive force from the electrical current supplied to the metallic electrolytic plates (141) by the power supply (145). Power supply (145) is typically a voltage source that preferably supplies at least 150 amperes at 25 volts. Energy to drive the reactions in the electrocoagulation reaction vessel (140) is provided by the power supply (145) which is preferably direct current. However, power supply (145) may use alternating current.

Particulate and dissolved contaminants in the pressurized waste fluid (101) come into contact and react via oxidation/reduction with the dissolved metallic ions and subsequently formed by-products sacrificed from the metallic electrolytic plate (141) surfaces in accordance with Faraday's Law. The dissolved gases formed, such as hydrogen and oxygen, remain in solution because the pressurized environment will not allow them to evolve. The pressurized environment increases the solubility and concentration of the gaseous products produced in solution with the pressurized waste fluid (101) thereby enhancing the oxidation/reduction reactions that occur in the electrocoagulation reaction vessel (140). At higher electrocoagulation pressures, an increased level of dissolved gases remain in solution and are available for reaction. Additionally, oxidizing agents, such as ozone, oxygen, chlorine, hydrogen peroxide or permanganate. Such oxidizing agents may be gaseous or liquid reagents that are injected or educted into the system to enhance oxidation/reduction reactions via an in-line eductor or corporation stop (126) located in the interconnecting pipe (116) before the connection of the riser pipe (138).

When the metallic electrolytic plates (141) are composed of iron, iron ions are sacrificed into solution and are quickly oxidized and hydrolyzed to iron oxyhydroxide, $Fe(OH)_3$. Trivalent ferric ions (Fe+++) are available to destabilize the electric charges on colloidal particulates and emulsified oil droplets, thereby allowing them to coalesce or agglomerate. Preferably, the ferric ions (Fe+++) react with the pressurized waste fluid (101) and contaminants forming amorphous iron oxyhydroxide which is easily precipitated. Both dissolved and particulate contaminants are adsorbed onto and trapped within the iron oxyhydroxide precipitate and are thus co-precipitated to form a purified effluent after liquid-solids separation.

As the pressurized fluid (101) exits the electrocoagulation reaction vessel (140), a flocculent is injected in-line via an eductor or corporation stop (127) located in the interconnecting piping (116) located downstream from the electrocoagulation reaction vessel (140). The flocculent aids in the rapid agglomeration of the precipitate and to enhance liquid-solid separation. Preferably, the flocculent is an agglomerating agent such as a known anionic, cationic, or non-ionic polymer and the like. Because the system is operated under high pressure in order to maintain gases in solution, the pressurized waste fluid (101) may be a two-phase mixture or suspension (i.e., liquids-solid). This two-phase mixture or suspension may be separated by conventional means. Liquid-solids separation, for example, may utilize a pressure dependent method such as hydrocyclone, membrane (ultrafiltration, microfiltration etc.), centrifugation, or flotation. For a preferred embodiment of this invention, separation utilizing flotation is preferred.

Solids are removed from the pressurized waste fluid (101) in a dissolved gas flotation chamber (150). The two-phase mixture of aqueous/liquid with dissolved gases and suspended solids from electrocoagulation reaction vessel (140) are delivered through the interconnecting pipe (116) to dissolved gas flotation chamber (150). The interconnecting pipe (116) is connected to a pressure relief valve (152) located at entrance to the dissolved gas flotation chamber (150). A riser pipe (153) with a pressure relief valve (154) is also connected to the interconnecting pipe (116) before the pressure relief valve (152). The elevation of the riser pipe (153) and the pressure relief valve (154) are such that they are the highest elevation in the system so that any gases that are not dissolved in solution will rise to the surface of the interconnecting pipe (116), migrate to the riser pipe (153), and be collected directly underneath the pressure relief valve (154), where it is periodically purged from the system. This will insure that no undissolved gases enter the dissolved gas flotation chamber (150) in the form of large bubbles that may disrupt flotation of suspended solids.

The pressure of the pressurized waste fluid (101) is reduced across pressure relief valve (152) to about the operating pressure of dissolved gas flotation chamber (150). Pressurized waste fluid (101) having a reduced pressure enters the dissolved gas flotation chamber (150) through the feedwell (155) and flows upward to inlet manifold (156) attached thereto. The inlet manifold (156) is submerged below the liquid surface or liquid operating level in the dissolved gas flotation chamber (150) where the dissolved gases in pressurized waste fluid (101) are released from solution as microfine bubbles (not shown). The gases evolved attach to the agglomerated, flocculated precipitate in the pressurized waste fluid (101), thereby increasing the buoyancy of such precipitate. The buoyant precipitate rapidly rises to the surface as a foam where it is skimmed off by a mechanical rake (157) and directed to downcomer pipe (158) and collected in a sludge tank (159) disposed below flotation chamber (150). The collected precipitate is pumped via an air diaphragm or progressive cavity pump (160) to a tank, such as a sludge tank, where the precipitate is dewatered and thickened to a sludge (not shown).

The clarified waste fluid (201) exits the dissolved gas flotation chamber (150) through an actuated valve (200) that receives a proportional signal from the controller (130) to maintain liquid operating level in the dissolved gas flotation chamber (150) and control flow rate of the effluent from the system. A level sensor (129) monitors the operating liquid level in the dissolved gas flotation chamber (150) and transmits a proportional signal to the controller (130).

The clarified effluent waste fluid (201), drawn from the clearwater section of the separator (flotation chamber)(150), may be recycled through an electrocoagulation reactor and then co-mingled with the influent water. This recycle rate is approximately 25% of the influent flow, but may vary by application. The recycle reactor flow (recirculating loop) ensures that the metal ions that are sacrificed from the electrolytic plates remain in solution and are available for chemical reactions with contaminants present in the influent wastewater fluid. Also, such recycle ensures that the gases that are evolved (i.e., oxygen and hydrogen) from the disassociation of water molecules are available to attach to particulates (or oil droplets) and enhance flotation phenomena. The recirculating flow provides the chemical energy required to treat a flow larger than that which is flowing through the reactor. Therefore a larger volume of water may be treated with a smaller reactor.

The clarified waste fluid (201) exiting the dissolved gas flotation chamber (150) is substantially free of dissolved metals and suspended particulate matter. Such clarified waste fluid may have a total organic carbon content (TOC) of about 50,000 mg./l. or more. The dissolved metals in the effluent is preferably less than about 2.0 mg./l. avg.; more preferably less than about 1.0 mg./l. avg.; still more preferably less than about 0.20 mg./l. avg.

The clarified waste fluid (201) is transferred to an equalization tank (190) via the interconnecting pipe (203) and enters the equalization tank (190) at the inlet port (197). Fluid level in the equalization tank (190) is monitored by a level monitor (196) that transmits a proportional signal to the controller (130). Any excess gas is vented via a vent port (195). At this point, the clarified waste fluid (201) is partially treated and may be recycled to service via a transfer pump (192). The clarified waste fluid (201) in the equalization tank (190) is aerated by an in-line aerator (194) located in a recirculation pipe (199). The fluid (201) is pumped via a transfer/recirculation pump (191). An actuated valve (193) is utilized to control the recirculating rate to the equalization tank (190).

Figure 2:
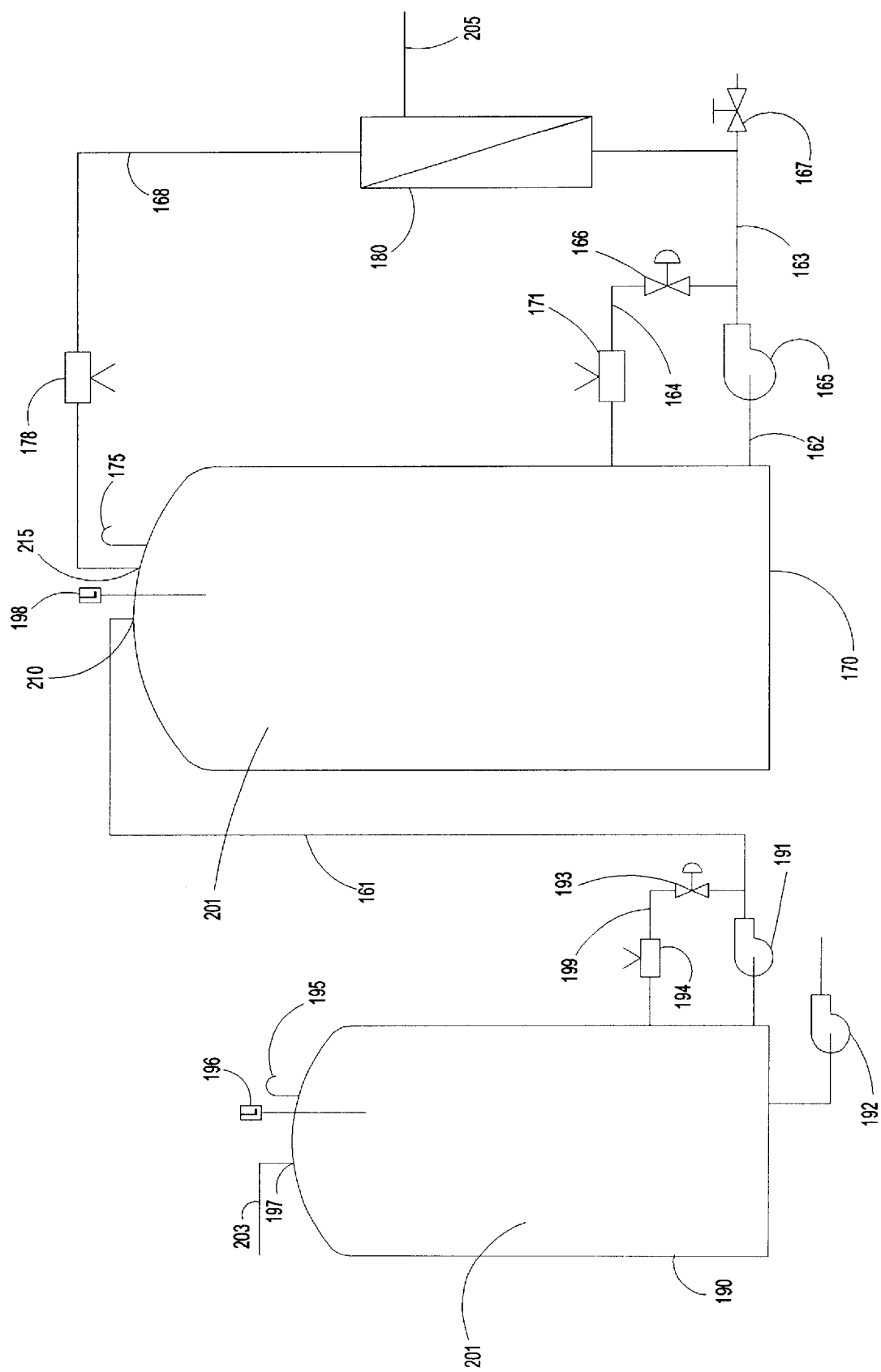
FIG. 2 is a schematic flow diagram of the membrane bioreactor that is to remove organic compounds from clarified waste fluid.

As shown in FIG. 2, organic compounds are removed from the clarified waste fluid (201) in an organics separating means (170). Such organics separating means (170) includes a membrane and/or a bioreactor. The clarified waste fluid (201) flows from equalization tank (190) to separating means (170) via transfer pipe (161) and transfer/recirculation pump (191). Interconnecting pipe (161) enters the organics separating means (170) at the inlet port (210). The fluid level in the organics separating means (170) is monitored by a level monitor (198) which transmits a proportional signal to the controller (130). Excess gas is vented via the vent port (175). In the case of a bioreactor, dissolved organics present in the clarified waste fluid (201) are digested by bacteria in organics separting means (170).

In the case of a membrane, the organics are retained prevented from flowing through the membrane and are concentrated and stored in the organic separating means vessel (170). A membrane bioreactor, however, is incorporated as a preferred embodiment of this invention because of its compact footprint and guaranteed effluent quality. Other bioreactor designs may also be utilized.

The organics separating means (170) may be aerated. The clarified fluid (201) flowing to the organic separating means (170) contains dissolved organic contaminates. When a membrane bioreactor is used, the clarified fluid (201) is recirculated through an in-line aerator (171) located in the recirculation pipe (164) via a pump (165). Pump (165) is connected to organics separating means (170) by a suction pipe (162). The recirculation rate is controlled by the actuated valve (166). The pump (165) also recirculates the clarified fluid (201) through a membrane or bank of membranes (180) via the recirculation pipe (163). The membrane or bank of membranes (180), are sized such that they will reject all dissolved organics and bacteria present in the clarified waste fluid (201) and only allow purified fluid (202) to be discharged via the discharge pipe (205). Dissolved organics and bacteria that are rejected by the membrane or bank of membranes (180) return to the membrane bioreactor vessel (170) for further treatment via the recirculation pipe (168) attached to the membrane reactor vessel (170) at the inlet port (215). An in-line aerator (178) is included in the recirculation pipe (168) to supply additional oxygen to the system. Sludge may be periodically purged from the system through valve (167) located at the discharge side of pump (165) in the recirculation pipe (163).

Figure 3:
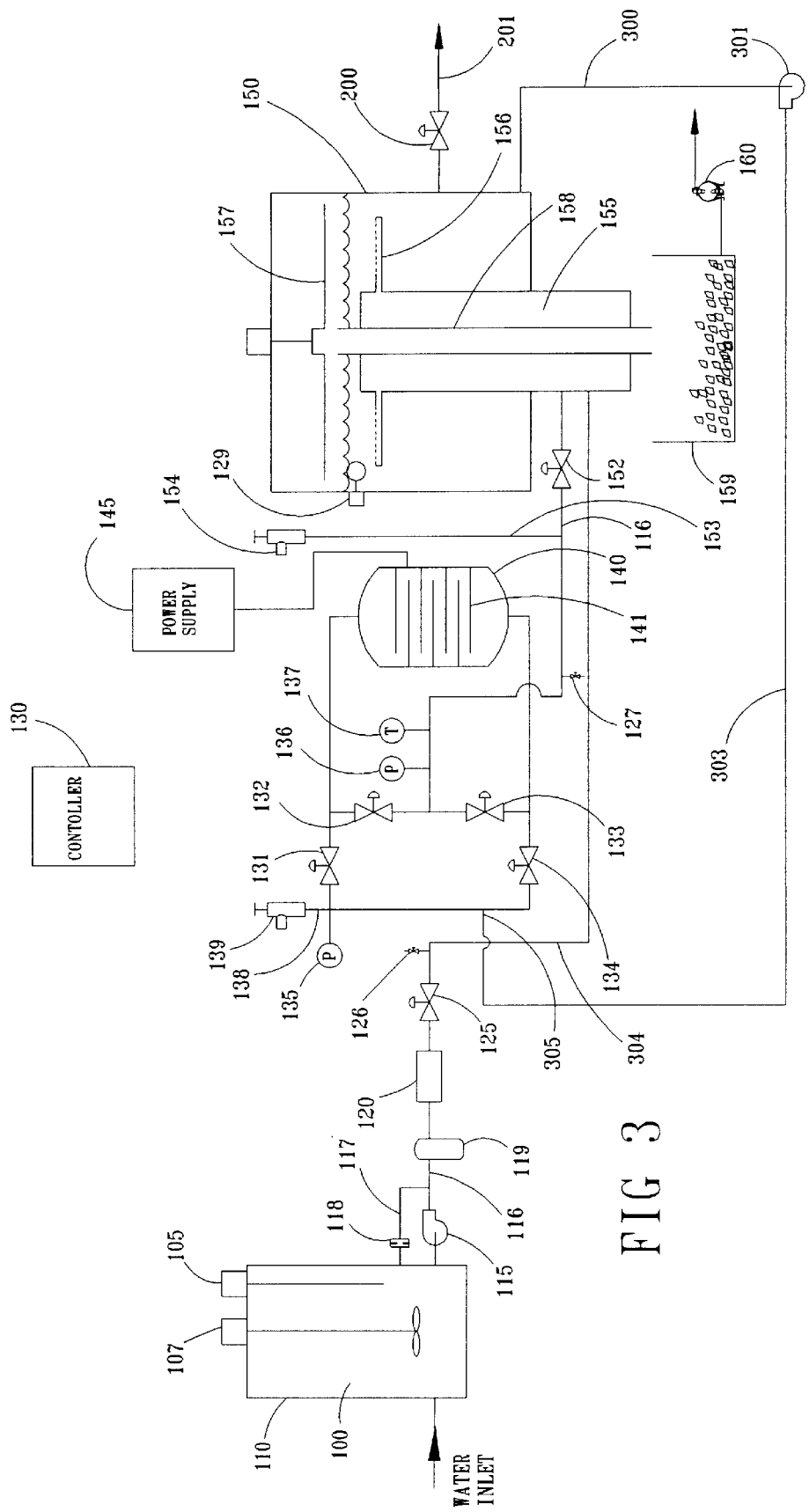
FIG. 3 is a schematic flow diagram of the elctrocoagulation process in which neutralized fluid is pumped to a dissolved gas flotation chamber via an interconnecting pipe in accordance with this invention.

As shown in FIG. 3, contaminated fluid (100) is collected in the equalization/neutralization tank (110) in the same manner as previously described. In this embodiment, the neutralized fluid (100) is pumped directly to the dissolved gas flotation chamber (150) via interconnecting pipe (304) entering through the feedwell (155). A high pressure recirculation pump (301) recirculates treated effluent (201) from the flotation chamber (150) to the electrocoagulation reaction vessel (140) via the interconnecting pipe (303) connected to the inlet side of the electrocoagulation vessel (140) at piping junction (305). The recirculation pump (301) has sufficient pressure to keep dissolved gases in solution (1–150 psi) and recirculates approximately 20% to 25% of the total volume of flow through the system (provided by pump (115). In this way, a smaller electrocoagulation reaction vessel (140) may be utilized to treat an increased volume of fluid (100). The electrocoagulation reaction vessel (140) provides the sacrificed metallic ion required for chemical reaction and dissolved gases to support liquid-solids separation (flotation) in the dissolved gas flotation chamber (150). The pressurized recirculated fluid is co-mingled with the influent contaminated fluid (100) in the feedwell (155) of the dissolved gas flotation chamber (150). The feedwell (155) is of sufficient capacity to allow the required retention time for reactions and flotation to occur.

The preferred embodiment of the present invention is further described in the following examples:

EXAMPLE 1

Petrochemical refining of alcohols (butanol, propanol, etc.) often use rare earth catalysts, such as Raney nickel and cobalt catalysts. Such catalysts result in waste fluids that contain high levels of organics and residual amounts of dissolved metals. Because of the high levels of organics that are present, these waste fluids are typically treated biologically. Biological organisms that consume the organics cannot tolerate high levels of dissolved metals such as chromium, cobalt, nickel, zinc, etc. and therefore biological systems do not perform well in this case. On the other hand, chemical treatment is effected in the presence of organics, and sometimes the chemicals necessary to precipitate metals in the presence of organics are the same chemicals that are detrimental to biological treatment processes. This process removes the dissolved metals and suspended solids from the wastewater therefore allowing clarified, metals free water to enter the bioreactor where the organics can be easily removed. The influent waste flow rate is about 50 gpm with a metals content of about 10 to 50 mg./l. avg. and a total organic carbon content (TOC) of about 50,000 mg./l. The electrocoagulation process of this invention has been shown to reduce the metals content to at least as low as 0.2 mg./l. avg., preferably as low as 0.1 mg./l/ avg. in the effluent clarified waste fluid. After further treatment in a bioreactor, such as a membrane bioreactor, or the like, the TOC of the effluent waste fluid was reduced to as low as 100 mg./l. avg. for discharge to the sensitive environments. (In the case of wastewater, this TOC level is suitable for water.)

EXAMPLE 2

Wastewater collected on offshore drilling and production platforms and other maritime applications contains a variety of contaminates including human waste, laundry, food and industrial waste. Stormwater, deckwash and produced waters must also be contained and disposed of properly. Space requirements are limited and logistics hinder delivery of water treatment chemicals as well as other supplies, including water.

This patent provides a non-chemical system for the removal of dissolved metals and suspended particulates and a membrane bioreactor for the treatment of dissolved organics. Combining electrocoagulation, flotation, and membrane bioreactor technologies results in the most compact footprint available and a guaranteed, treated effluent quality. Water can be recycled from various points in the system dependent on required quality. An array of reverse osmosis membranes can be included as final polish to produce drinking quality water. The process provides a reliable, economical system for the attainment of zero-discharge and recycling of water in oil field drilling and production operations.

This invention has several advantages. First, the hydrogen and oxygen gas produced remains in solution during electrolysis of the waste fluid which promotes enhanced oxidation reduction reactions. In addition, contaminations of such gases are avoided for there is no need to introduce outside gases (i.e. air).

Second, electrocoagulation results in the precipitation of dissolved species, the destabilization (coagulation) of suspended particulates, and destabilization of oil-water emulsions. This eliminates the need for the addition of chemicals to precipitate contaminants prior to liquid-solids separation. The electromotive force in the reaction zone kills bacteria by disrupting the osmotic forces in the cell. The construction materials for the electrolytic plates may be varied relative to dissolved contaminants or degree of electrolysis required for flotation. Further, filtration equipment may be incorporated to remove residual particulates (i.e., polishing step). Adjustment of the pH of the wastewater may be required. Wastewater may be screened and treated effluent may be recycled through an additional reactor to enhance electrolysis and generate more bubbles.

Third, the amount and size of bubbles for clarification of the treated waste may be controlled by varying in the pressure of the system. Water is disassociated into oxygen gas and hydrogen gas which produce finer bubbles for improved clarification by flotation.

Fourth gases are liberated simultaneously with precipitation of contaminants resulting in faster flotation and smaller flotation chamber. Precipitation and clarification may be accomplished in a single step. A typical flotation unit requires total dispersion of gases in the flotation chamber which are introduced through a header system in the chamber bottom which interfere with sludge settling and removal.

In addition, the improved electrocoagulation process of this invention eliminates the need for complex unit operations. Compressors and eductor systems for multiple additives may not be needed. The reactor vessel electrode design may be simplified. A higher flow rate than prior art process may be achieved with smaller-sized processing equipment. The process may be arranged on a skid for improved portability. A membrane bioreactor may be included to disinfect the effluent wastewater and for drinking water.

While the present invention has been described and/or illustrated with particular reference to a process for the electrocoagulation of waste fluids, it is noted that the scope of the present invention is not restricted to the embodiment(s) described. It should be apparent to those skilled in the art that the scope of the invention includes other methods and applications using other equipment or processes than those specifically described. Moreover, those skilled in the art will appreciate that the invention described above is susceptible to variations and modifications other than those specifically described. It is understood that the present invention includes all such variations and modifications which are within the spirit and scope of the invention. It is intended that the scope of the invention not be limited by the specification, but be defined by the claims set forth below.

We claim:

1. An electrocoagulation process for removing organic, particulate and metal contaminants from a waste fluid to form a clarified waste fluid, comprising the steps of:
   (a) supplying said waste fluid to a reactor vessel having a plurality of substantially parallel electrolytic plates, said electrolytic plates having a positive or a negative charge provided by a power supply;
   (b) increasing the pressure of said waste fluid;
   (c) reacting said charged electrolytic plates with said organic and metal contaminants in said waste fluid to form precipitate particles and dissolved gases that remain in solution in said pressurized waste fluid;
   (d) reducing the pressure of said waste fluid to release said dissolved gases and to cause said precipitate particles to rise in said vessel; and
   (e) removing said precipitate particles from said vessel to form said clarified waste fluid.

2. The electrocoagulation process of claim 1 wherein step (b) includes removing undissolved gases from said waste fluid.

3. The electrocoagulation process of claim 1 wherein step (c) includes removing undissolved gases from said pressurized waste fluid.

4. The electrocoagulation process of claim 1 further comprising the step of separating said organic contaminants from said clarified waste fluid.

5. The electrocoagulation process of claim 4 wherein the separating step includes separating said organic compounds in a separating means.

6. The electrocoagulation process of claim 5 wherein the separating means is selected from the group consisting of a membrane and a bioreactor.

7. The electrocoagulation process of claim 1 further comprising the step of collecting said particulate particles.

8. The process of claim 1 further comprising the step of adding an agglomerating agent, said agglomerating agent selected from the group consisting of an anionic polymer, a cationic polymer, a non-ionic polymer and combinations thereof.

9. An electrocoagulation process for removing organic, particulate and metal contaminants from a waste fluid to form a clarified waste fluid, comprising the steps of:
   (a) supplying said waste fluid to a reactor vessel having a plurality of substantially parallel electrolytic plates, said electrolytic plates having a positive or a negative charge provided by a power supply;
   (b) increasing the pressure of said waste fluid;
   (c) adding an oxidizing agent, said oxidizing agent selected from the group consisting of oxygen, chlorine, permanganate, hydrogen peroxide and ozone;
   (d) reacting said charged electrolytic plates with said organic and metal contaminants in said waste fluid to form precipitate particles and dissolved gases that remain in solution in said pressurized waste fluid;
   (e) reducing the pressure of said waste fluid to release said dissolved gases and to cause said precipitate particles to rise in said vessel; and
   (f) removing said precipitate particles from said vessel to form said clarified waste fluid.

10. The electrocoagulation process of claim 9 wherein step (b) includes removing undissolved gases from said waste fluid.

11. The electrocoagulation process of claim 9 wherein step (c) includes removing undissolved gases from said pressurized waste fluid.

12. The electrocoagulation process of claim 9 further comprising the step of separating said organic contaminants from said clarified waste fluid.

13. The electrocoagulation process of claim 12 wherein the separating step includes separating said organic compounds in a separating means.

14. The electrocoagulation process of claim 13 wherein the separating means is selected from the group consisting of a membrane and a bioreactor.

15. The electrocoagulation process of claim 9 further comprising the step of collecting said particulate particles.

16. An electrocoagulation process for removing organic, particulate and metal contaminants from a waste fluid to form a clarified waste fluid, comprising the steps of:
   (a) supplying said waste fluid to a reactor vessel having a plurality of substantially parallel electrolytic plates, said electrolytic plates having a positive or a negative charge provided by a power supply;
   (b) increasing the pressure of said waste fluid;
   (c) reacting said charged electrolytic plates with said organic and metal contaminants in said waste fluid to form precipitate particles and dissolved gases that remain in solution in said pressurized waste fluid;
   (d) reducing the pressure of said waste fluid to release said dissolved gases and to cause said precipitate particles to rise in said vessel;
   (e) removing said precipitate particles from said vessel to form said clarified waste fluid; and
   (f) recycling at least a portion said clarified waste fluid stream to said reactor vessel.

17. The electrocoagulation process of claim 16 wherein step (b) includes removing undissolved gases from said waste fluid.

18. The electrocoagulation process of claim 16 wherein step (c) includes removing undissolved gases from said pressurized waste fluid.

19. The electrocoagulation process of claim 16 further comprising the step of separating said organic contaminants from said clarified waste fluid.

20. The electrocoagulation process of claim 19 wherein the separating step includes separating said organic compounds in a separating means.

21. The electrocoagulation process of claim 20 wherein the separating means is selected from the group consisting of a membrane and a bioreactor.

22. The electrocoagulation process of claim 16 further comprising the step of collecting said particulate particles.

23. The process of claim 16 further comprising the step of adding an agglomerating agent, said agglomerating agent selected from the group consisting of an anionic polymer, a cationic polymer, a non-ionic polymer and combinations thereof.

24. An electrocoagulation process for removing organic, particulate and metal contaminants from a waste fluid to form a clarified waste fluid, comprising the steps of:
    (a) supplying said waste fluid to a reactor vessel having a plurality of substantially parallel electrolytic plates, said electrolytic plates having a positive or a negative charge provided by a power supply;
    (b) increasing the pressure of said waste fluid;
    (c) adding an oxidizing agent, said oxidizing agent selected from the group consisting of oxygen, chlorine, permanganate, hydrogen peroxide and ozone;
    (d) reacting said charged electrolytic plates with said organic and metal contaminants in said waste fluid to form precipitate particles and dissolved gases that remain in solution in said pressurized waste fluid;
    (e) reducing the pressure of said waste fluid to release said dissolved gases and to cause said precipitate particles to rise in said vessel;
    (f) removing said precipitate particles from said vessel to form said clarified waste fluid; and
    (g) recycling at least a portion said clarified waste fluid stream to said reactor vessel.

25. The electrocoagulation process of claim 24 wherein step (b) includes removing undissolved gases from said waste fluid.

26. The electrocoagulation process of claim 24 wherein step (c) includes removing undissolved gases from said pressurized waste fluid.

27. The electrocoagulation process of claim 24 further comprising the step of separating said organic contaminants from said clarified waste fluid.

28. The electrocoagulation process of claim 27 wherein the separating step includes separating said organic compounds in a separating means.

29. The electrocoagulation process of claim 28 wherein the separating means is selected from the group consisting of a membrane and a bioreactor.

30. The electrocoagulation process of claim 24 further comprising the step of collecting said particulate particles.

31. The method as in any one of claims 1–30 inclusive, in which the pressure of step (c) is from about 1 psig to about 150 psig.

32. The method as in any one of claims 1–30 inclusive, in which the pressure of step (c) is from about 60 psig to about 150 psig.

33. An apparatus for treating organics, particulates and metal contaminates in a waste fluid using electrocoagulation, comprising:
    a collection means having an inlet for collecting said waste fluid;
    a reactor vessel in fluid communication with said collection means, said reactor vessel having a vessel pressure and a plurality of substantially parallel positively and negatively charged electrolytic plates;
    a power supply connected to said electrolytic plates, said power supply provides a voltage that causes said contaminants to react with said electrolytic plates to form dissolved gases and precipitate particles in said waste fluid;
    a pressurizing means in fluid communication with said reactor vessel for pressurizing said waste fluid to said vessel pressure of said reactor vessel;
    a flotation chamber in fluid communication with said reactor vessel, said flotation chamber having a chamber pressure below said vessel pressure so that dissolved gases evolve from said waste fluid causing said precipitate particles to float to a fluid surface for removal to form a clarified waste fluid.

34. The apparatus of claim 33 wherein said reactor vessel is in fluid communication with a pressure relief valve for removing undissolved gases from said reactor vessel.

35. The apparatus of claim 33 wherein said flotation chamber is in fluid communication with a pressure relief valve for removing undissolved gases from said flotation chamber.

36. The apparatus of claim 33 wherein said flotation chamber includes a feedwell structured in combination with an inlet manifold for evolving dissolved gasses and to float said precipitate particles.

37. The apparatus of claim 33 wherein said flotation chamber includes a rake for directing said precipitate particles from said fluid surface to a downcomer pipe that is proximate a precipitate collection means.

38. The apparatus of claim 33 wherein said precipitate collection means is a sludge tank.

39. The apparatus of claim 33 further comprising organics removal means for removing organics from said clarified waste fluid to form a purified fluid stream.

40. The apparatus of claim 33 wherein the organics removal means is selected from the group consisting of a reactor having a membrane and a bioreactor.

41. The apparatus as in any one of claims 33–40 further comprising a recycle means for recycling at least a portion of said clarified waste fluid from said flotation chamber to said reactor vessel.

* * * * *